United States Patent
Dettinger et al.

(10) Patent No.: US 7,996,384 B2
(45) Date of Patent: Aug. 9, 2011

(54) QUERY BASED RULE OPTIMIZATION THROUGH RULE COMBINATION

(75) Inventors: Richard Dean Dettinger, Rochester, MN (US); Frederick Allyn Kulack, Rochester, MN (US); Shannon Everett Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 11/954,648

(22) Filed: Dec. 12, 2007

(65) Prior Publication Data

US 2009/0157606 A1    Jun. 18, 2009

(51) Int. Cl.
    *G06F 7/00* (2006.01)
(52) U.S. Cl. .......................... 707/713
(58) Field of Classification Search ........ 707/714, 707/713, 999.002
    See application file for complete search history.

(56) References Cited

U.S. PATENT DOCUMENTS

| | | | |
|---|---|---|---|
| 6,732,094 B1 * | 5/2004 | Cousins et al. ........ | 707/5 |
| 7,461,052 B2 * | 12/2008 | Dettinger et al. ...... | 707/3 |
| 2002/0078041 A1 * | 6/2002 | Wu .................... | 707/4 |
| 2005/0120001 A1 * | 6/2005 | Yagoub et al. ........ | 707/3 |
| 2007/0198501 A1 * | 8/2007 | Sundaranatha ........ | 707/4 |
| 2008/0046334 A1 * | 2/2008 | Lee et al. ............. | 705/26 |
| 2009/0228421 A1 * | 9/2009 | Citeau ................. | 706/48 |

OTHER PUBLICATIONS http://www.velocityreviews.com/forums/t441308-code-optimization.html; Feb. 13, 2006.*

* cited by examiner

*Primary Examiner* — John R. Cottingham
*Assistant Examiner* — Mohammed R Uddin
(74) *Attorney, Agent, or Firm* — Patterson & Sheridan, LLP (57) ABSTRACT

Embodiments of the invention provide techniques for optimizing the processing of abstract rules included in rule set containers. In one embodiment, a first abstract rule may be identified as having an effect on a second abstract rule of the rule set container. A predicate and an action of the first abstract rule may be used in translating the second abstract rule into an executable rule. The executable rule performs the functionality included in the first and second abstract rules, while only requiring one rule execution in a rule engine. In another embodiment, the first abstract rule may be translated into a rejection query configured to return a rejection set. The second abstract rule may be translated into an executable rule that includes a condition that excludes any records included in the rejection set.

21 Claims, 7 Drawing Sheets

QUERY BASED RULE OPTIMIZATION THROUGH RULE COMBINATION

BACKGROUND OF THE INVENTION

1. Field of the Invention

The invention generally relates to computer database systems. More particularly, the invention relates to techniques for optimizing the processing of abstract rule sets.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS). Queries of a relational database may specify which data items should be retrieved, how to join various data items, and conditions (predicates) that must be satisfied for a particular data item to be included in a query result table.

The complexity of constructing a query statement, however, generally makes it difficult for average users to compose queries of a relational database. Because of this complexity, users often turn to database query applications to assist them in composing queries of a database. One technique for managing the complexity of a relational database, and the SQL query language, is to use a database abstraction model. Generally, a database abstraction model is constructed from logical fields that map to data stored in the underlying physical database. Data abstraction models may be used to implement abstract rules. Abstract rules specify predicates and actions, and are composed with reference to logical fields. Abstract rules may be executed in a rule engine in order to perform an analysis routine.

SUMMARY OF THE INVENTION

One embodiment of the invention includes a computer-implemented method. The method may generally include receiving a rule set container storing a plurality of abstract rules. Each abstract rule may include (i) a conditional statement and (ii) a consequential statement defining a result returned by an abstract rule for a data record supplied to the abstract rule satisfying the conditional statement. The method also includes identifying a first abstract rule among the plurality of abstract rules, where the consequential statement of the first abstract rule specifies to reject data records that satisfy the conditional statement from being processed by other abstract rules among the plurality of abstract rules. The method also includes identifying a second abstract rule among the plurality of abstract rules, where the consequential statement of the second abstract rule specifies an inference message to return for data records that satisfy the conditional statement. The method may also include transforming the first abstract rule and the second abstract rule into an executable rule and storing the transformed executable rule for execution against a database query result. The executable rule may include the consequential statement of the second abstract rule and a new conditional statement. The new conditional statement may comprise the conditional statement of the second abstract rule and an exclusionary conditional statement that excludes data records satisfying the conditional statement of the first abstract rule.

Another embodiment of the invention includes a computer readable storage medium containing a program which, when executed, performs an operation. The operation may generally include receiving a rule set container storing a plurality of abstract rules. Each abstract rule includes (i) a conditional statement and (ii) a consequential statement defining a result returned by an abstract rule for a data record supplied to the abstract rule satisfying the conditional statement. The operation may further include identifying a first abstract rule among the plurality of abstract rules, and identifying a second abstract rule among the plurality of abstract rules. The consequential statement of the first abstract rule specifies to reject data records that satisfy the conditional statement from being processed by other abstract rules among the plurality of abstract rules. The consequential statement of the second abstract rule specifies an inference message to return for data records that satisfy the conditional statement. The operation may further include transforming the first abstract rule and the second abstract rule into an executable rule and storing the transformed executable rule for execution against a database query result. The executable rule includes the consequential statement of the second abstract rule and a new conditional statement. The new conditional statement comprises the conditional statement of the second abstract rule and an exclusionary conditional statement that excludes data records satisfying the conditional statement of the first abstract rule.

Still another embodiment of the invention includes a system having a processor and a memory containing a program which, when executed on the processor, is configured to process an abstract rule. The program may be generally configured to receive a rule set container storing a plurality of abstract rules, wherein each abstract rule includes (i) a conditional statement and (ii) a consequential statement defining a result returned by an abstract rule for a data record supplied to the abstract rule satisfying the conditional statement. The program may be further configured to identify a first abstract rule among the plurality of abstract rules and identify a second abstract rule among the plurality of abstract rules. The consequential statement of the first abstract rule may specify to reject data records that satisfy the conditional statement from being processed by other abstract rules among the plurality of abstract rules. The consequential statement of the second abstract rule may specify an inference message to return for data records that satisfy the conditional statement. The program may be further configured to transform the first abstract rule and the second abstract rule into an executable rule and store the transformed executable rule for execution against a database query result. The executable rule includes the consequential statement of the second abstract rule and a new conditional statement. The new conditional statement comprises the conditional statement of the second abstract rule and an exclusionary conditional statement that excludes data records satisfying the conditional statement of the first abstract rule.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Generally, a database abstraction model is constructed from logical fields that map to data stored in the underlying physical database. Each logical field defines an access method that specifies a location (e.g., a table and column) in the underlying database from which to retrieve data for a given logical field. Users compose an abstract query by selecting logical fields and specifying conditions. Data is retrieved from the physical database by generating a resolved query (e.g., an SQL statement) from the abstract query, based on the definition of each logical field included in an abstract query. Because the database abstraction model is not tied to the syntax or the semantics of the physical database, additional capabilities may be provided by the database abstraction model without having to modify the underlying database.

Inference rules may be used to evaluate data in a database. A set of rules may implement an analysis routine used to detect (or infer) states or conditions about data, and a rule engine can evaluate predicates and execute actions defined in the rules. Where actions of rules are defined to provide recommendations for users, for example, treatment recommendations for doctors in medical institutions, the rules may be defined such that corresponding predicates reflect expert-based knowledge of possible diagnoses and evaluations of patient conditions. Thus, in such a case, rules may be implemented to assist doctors by making diagnosis recommendations, drug recommendations, providing reminders of required verifications and checks, etc.

However, composing inference rules is frequently a complex and difficult process which requires detailed knowledge of a given database as well as the requisite expert knowledge for rule semantics. More specifically, for each predicate, and for each action of the given rule that the user wants to create, the user may require an understanding of the database schema in order to identify the correct tables and columns, and relationships between tables and columns in the underlying database table(s). One technique for managing the creation of rules is to use abstract rule sets. Abstract rules specify predicates and actions composed using to logical fields of a database abstraction model. Because the logical fields provide a user with a logical view of data, the user may compose rules based on their conceptual understating of the data, without the need to also understand the physical layout of the underlying database or query language grammar.

Analysis routines can be defined by abstract rule sets including one or more abstract rules, each having one or more predicates and actions. Commonly, abstract rules may be composed using the structure:

IF [predicate] THEN [perform specified action]

A rule predicate specifies a conditional statement evaluated in a rule engine. As stated, the predicate may be composed from the logical fields of a data abstraction model. Further, prior to being evaluated by the rule engine, the predicate may be transformed into a form executable by the rule engine. For example, the rule engine may transform the predicate into an SQL query used to identify database records that satisfy the condition specified in the predicate, e.g., a set of patient identifiers. For database records that satisfy the predicate (i.e., meet the condition), then rule engine may execute the rule action specified by the rule.

Embodiments of the invention provide techniques for optimizing the processing of abstract rules included in rule set containers. An abstract rule container may provide a plurality of abstract rules to apply to a given set of data. In one embodiment, a first abstract rule may be identified as having an effect on a second abstract rule of the rule set container. A predicate and an action of the first abstract rule may be used in translating the second abstract rule into an executable rule. The executable rule performs the functionality included in the first and second abstract rules, while only requiring one rule execution in a rule engine. In another embodiment, the first abstract rule may be translated into a rejection query configured to return a rejection set. The second abstract rule may be translated into an executable rule that includes a condition that excludes any records included in the rejection set. By use of embodiments of the invention, processing loads and licensing costs of using the rule engine may be reduced.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
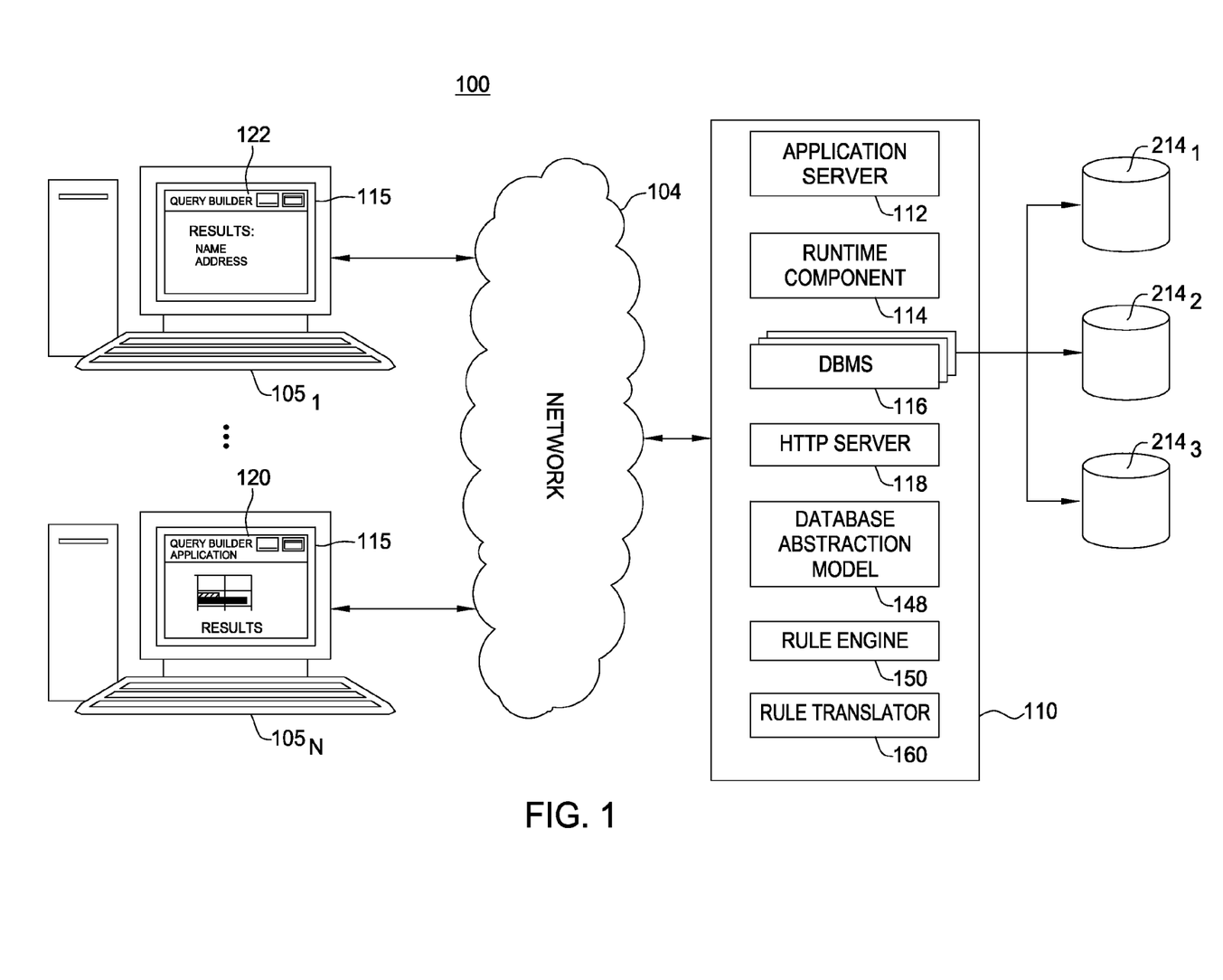
FIG. 1 illustrates a network environment using a client-server configuration, according to one embodiment of the invention.

FIG. 1 illustrates a network environment 100 using a client-server configuration, according to one embodiment of the invention. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The network environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by a user interface 115. In a particular embodiment, GUI content may comprise HTML documents (i.e., web-pages) rendered on a client computer system $105_1$ using web-browser 122. In such an embodiment, the server system 110 includes a Hypertext Transfer Protocol (HTTP) server 118 (e.g., a web server such as the open source Apache web-server program or IBM's Web Sphere® program) configured to respond to HTTP requests from the client system 105 and to transmit HTML documents to client system 105. The web-pages themselves may be static documents stored on server system 110 or generated dynamically using an application server 112 interacting with HTTP server 118 to service HTTP requests. In another embodiment, client application 120 may comprise a database front-end, or query application program running on client system $105_N$. The web-browser 122 and application 120 may be configured to allow a user to compose an abstract query, and to submit the query to the runtime component 114 for processing. In yet another embodiment, client application 120 may be configured to enable a user to specify an abstract query to be run in a scheduled process. Such a scheduled process may be used, for example, to perform a daily analysis of database records.

As illustrated in FIG. 1, server system 110 may further include a runtime component 114, a database management system (DBMS) 116, a database abstraction model (DAM) 148, a rule engine 150 and a rule translator 160. In one embodiment, these components may be provided using software applications executing on the server system 110. The DBMS 116 includes a software application configured to manage databases $214_{1-3}$. That is, the DBMS 116 communicates with the underlying physical database system, and manages the physical database environment behind the database abstraction model 148. Users interact with the user interface 115 to compose and submit an abstract query to the runtime component 114 for processing.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL) queries from an abstract query. The resolved queries generated by the runtime component 114 are supplied to DBMS 116 for execution. Additionally, the runtime component 114 may be configured to modify the resolved query with additional restrictions or conditions, based on the focus of the abstract query.

In one embodiment, the rule engine 150 represents one or more rule engines (i.e., inference engines) configured to carry out analysis routines for various purposes, including know-how management, decision making and statistical analysis. More specifically, the rule engine 150 can carry out analysis routines by processing rule sets including one or more rules, with each rule having predicates and actions. The rule engine 150 may be a software application installed on server 110. Alternatively, the rule engine 150 may be provided as "software as a service" (SAAS), wherein functions on a remote hosted system are accessed over a network as required. Rule engine 150 may be licensed on a "per use" basis, meaning each use of a function included in rule engine 150 is charged as a separate cost. Further, rule engine 150 may be licensed so that costs are based on the number of users or number of processors accessing the rule engine 150.

As described, abstract rules are composed by referencing logical fields of DAM 148, and thus do not require a user to understand the schema of the physical database 214. Rule translator 160 represents a software application configured to translate abstract rules to executable rules, which are formatted in the data format required by the rule engine 150. The executable rules may also be resolved to the database 214. Rule translator 160 may be further configured to optimize the execution of rule engine 150 by combining multiple abstract rules into one executable rule. Rule translator 160 is further described below with reference to FIGS. 2 and 3.

Figure 2:
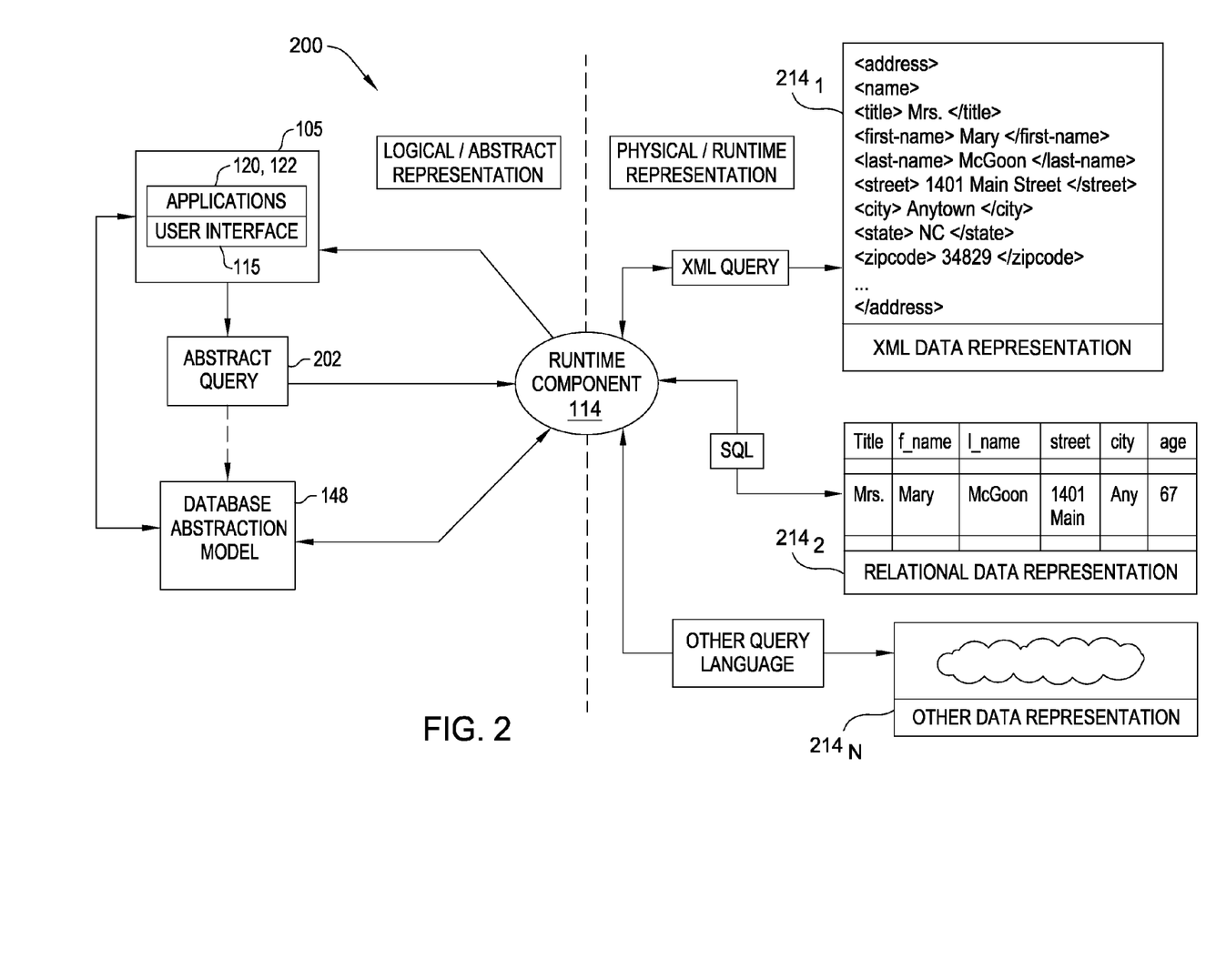
FIG. 2 is a diagram illustrating a database abstraction model constructed over an underlying physical database, according to one embodiment of the invention.

FIG. 2 illustrates a plurality of interrelated components of a database abstraction model, along with relationships between the logical view of data provided by the abstraction model environment (the left side of FIG. 2), and the underlying physical database mechanisms used to store the data (the right side of FIG. 2).

In one embodiment, users may compose an abstract query 202 using the user interface 115 provided by applications 120, 122. An abstract query 202 is generally referred to as "abstract" because it is composed using logical fields rather than direct references to data structures in the underlying physical databases 214. The logical fields include specifications of access methods for mapping to a physical view of the data, including various underlying storage mechanisms. For example, for a given logical field, the runtime component may be generate an XML query that queries data from database $214_1$, an SQL query of relational database $214_2$, or other query composed according to another physical storage mechanism using "other" data representation $214_3$, or combinations thereof (whether currently known or later developed).

In one embodiment, the results of abstract query 202 may be used as inputs for executing an abstract rule. That is, a rule engine (e.g., rule engine 150 illustrated in FIG. 1) may be configured to process abstract rules by using the results of an abstract query 202 as rule inputs. For example, consider a DAM configured for data records of a hospital. An abstract query performed in the hospital DAM may retrieve patient data records for use as inputs to abstract rule sets. Assume that the abstract rule sets are configured to identify patients receiving improper or insufficient treatment (e.g., patients receiving medication that is incompatible with their genetic make-up). Thus, in this example, processing the abstract rule sets with patient data is performed as an analysis routine to alert medical personnel of potentially dangerous or critical situations. Such analysis routines may be scheduled to be run periodically (e.g., daily, weekly, etc.), in order to analyze new or updated data.

Figure 3:
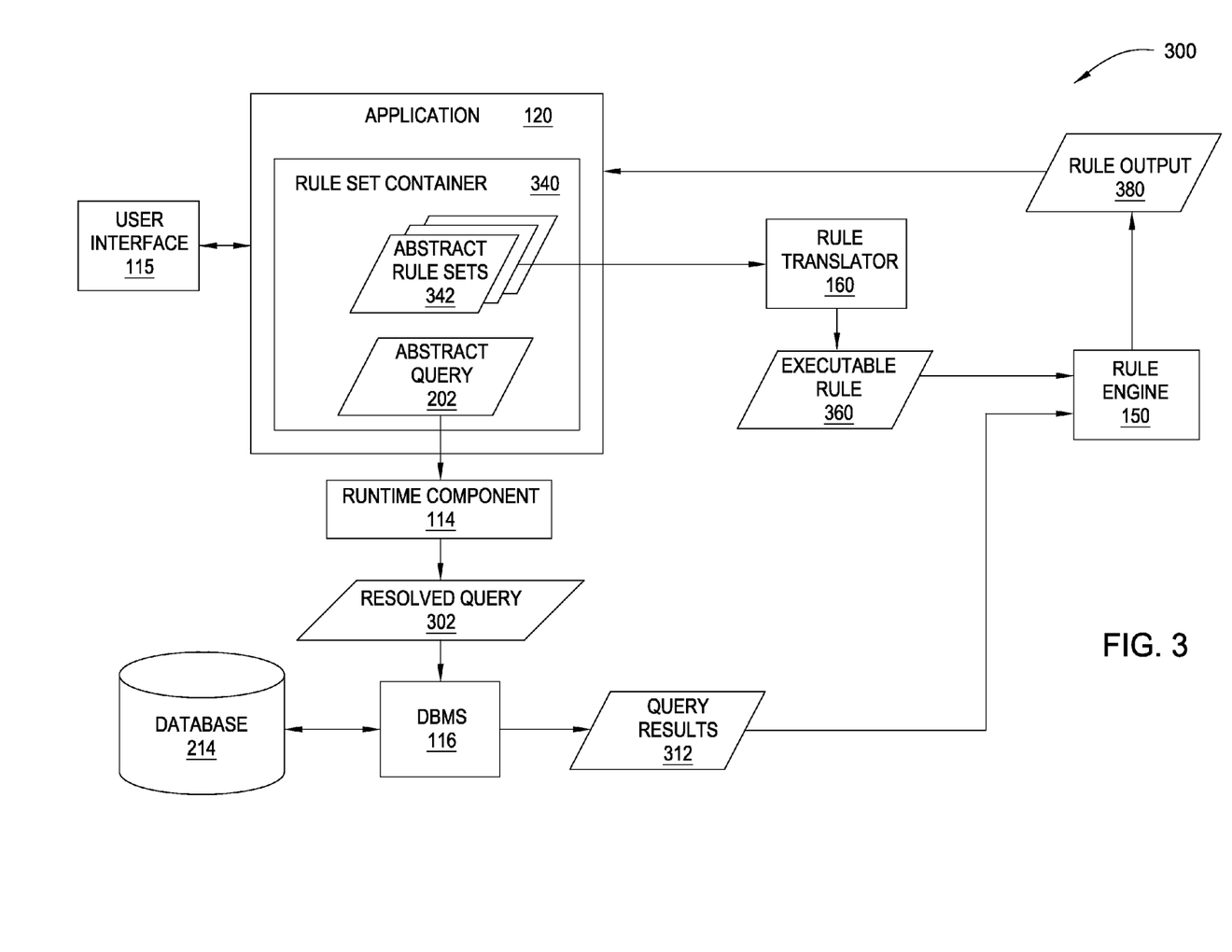
FIG. 3 illustrates a relational view of software components for optimizing the processing of abstract rule sets, according to one embodiment of the invention.

FIG. 3 illustrates a relational view of software components 300 for optimizing the processing of abstract rule sets, according to one embodiment of the invention. As shown, software components 300 include application 120, user interface 115, runtime component 114, database management system (DBMS) 116, database 214, rule engine 150, and rule translator 160.

Application 120 may include a rule set container 340 configured to store multiple abstract rule sets 342. A user may interact with application 120 via user interface 115. In one embodiment, each abstract rule set 342 may be directed to a particular area of expertise, and may be composed and maintained by a subject matter expert. For example, consider a rule set container 340 used for performing medical diagnosis routines. The rule set container 340 may include a first abstract rule set 342 that requires an input of a result for a particular genetic test retrieved from database 214. The same rule set container 340 may also include a second abstract rule set 342 that excludes any test results that are more than one year old. Assume that the first abstract rule set 342 is maintained by a geneticist, and the second abstract rule set 342 is maintained by a data quality analyst. In such a case, the geneticist may not have the expertise to maintain the second abstract rule set 342. Similarly, the data quality analyst may not have the expertise to maintain the first abstract rule set 342.

In one embodiment, rule set container 340 is a data structure configured to enable the processing of multiple abstract rule sets 342 in combination. More specifically, rule container 340 may enable multiple abstract rule sets 342, directed to various areas of expertise, to be processed together with a single set of data inputs, while allowing each abstract rule set 342 to be maintained separately by different rule set owners (i.e., subject matter experts). In one embodiment, rule set container 340 may contain multiple abstract rule sets 342. Alternatively, rule set container 340 may store pointers to external abstract rule sets 342 (possibly stored in their own rule set containers 340). Thus, in this embodiment, one abstract rule set 342 may be associated to multiple rule set containers 340.

As shown in FIG. 3, rule set container 340 also includes an abstract query 202. As described, abstract query 202 may be composed by using logical fields of DAM 148 to specify query conditions and results fields. Similarly, abstract rule sets 342 may be composed by using logical fields to specify a rule predicate and a rule action. Illustratively, the abstract rule sets 342 and abstract query 202 may be created in the user interface 115, which in this example is a graphical user interface. However, it should be noted that the user interface 115 is only shown by way of example; any suitable requesting entity may create abstract rule sets 342 and abstract queries 202 (e.g., application 120, an operating system, or an end user).

As shown, abstract query 202 may be translated by runtime component 114 into a resolved query 302. Resolved query 302 is submitted to DBMS 116 for execution against database 214, thus producing query results 312. The query results 312 may provide data values used as inputs to an abstract rule set 342. However, it should be noted that the present invention is not limited to the use of field values obtained from query results as inputs to abstract rule set 342. Instead, any suitable inputs to abstract rule set 342 are broadly contemplated including, for instance, a user inputting data via user interface 115.

In one embodiment, an abstract rule set 342 is translated into executable rule 360 by rule translator 160. As a result of the translation, executable rule 360 is formatted in a format used by rule engine 150. One example of such a data format is the Arden syntax, which is used in rule engines for medical knowledge. Further, the predicates included in executable rule 360 (and abstract query 202) may be resolved to query fragments executable by DBMS 116 (e.g., an SQL query fragment). That is, instead of the logical fields referenced by the abstract rule set 342, the executable rule 360 references data structures in the underlying physical database 214.

In one embodiment, rule translator 160 may be configured to translate multiple abstract rules into a single executable rule 360, such that the efficiency of executing the rules in rule set container 340 may be improved. More specifically, rule translator 160 may determine whether an abstract rule affects other abstract rules included in rule set container 340. If so, the predicate and action of the affecting rule may be incorporated into the executable version of the affected rule.

Figure 4A:
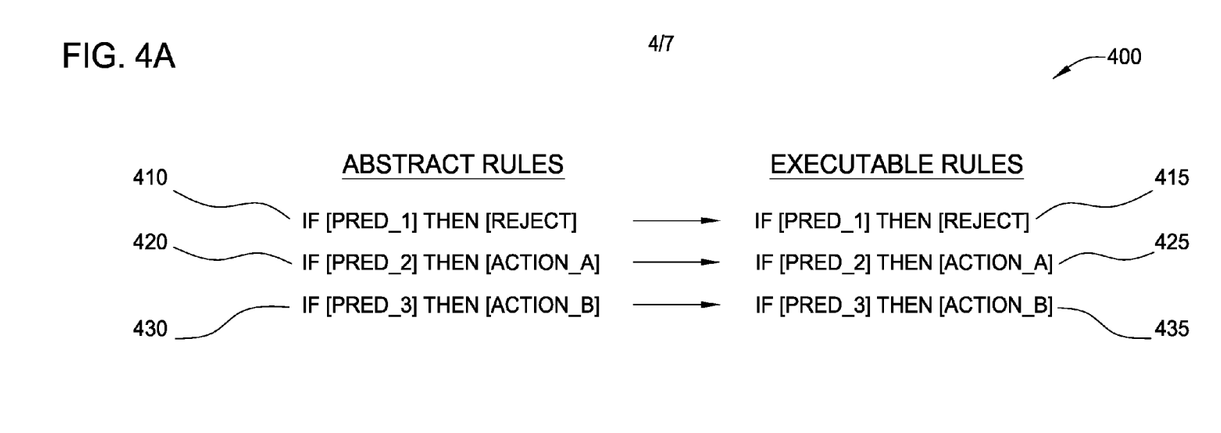
FIGS. 4A-4C provide a conceptual illustration of translating abstract rules into executable rules, according to one embodiment.
Figure 4B:
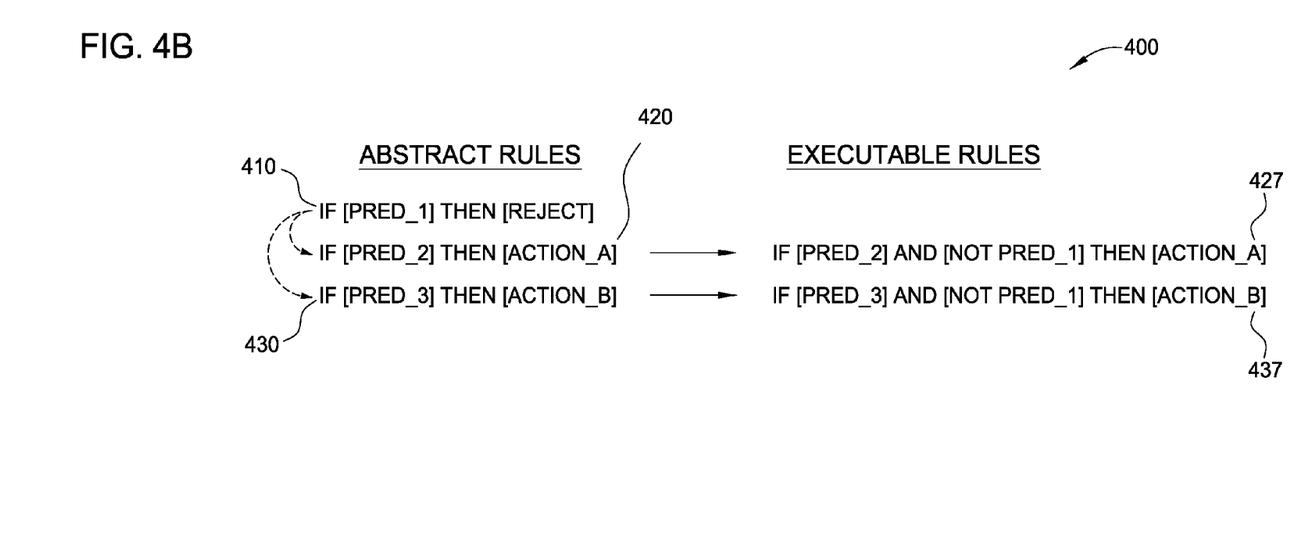
Figure 4C:
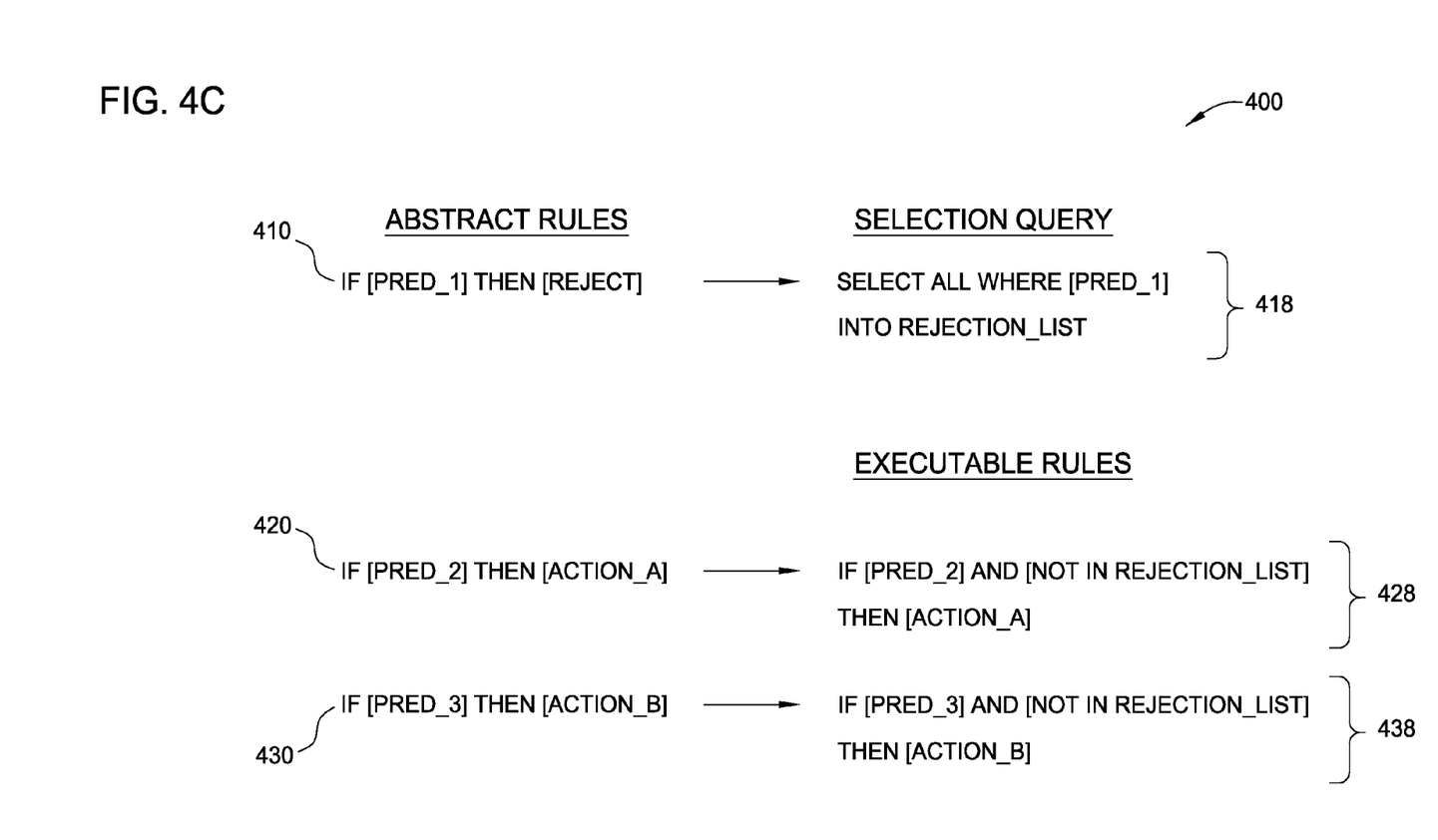

FIGS. 4A-4C provide an illustration 400 of translating abstract rules into executable rules, according to one embodiment. As shown in FIG. 4A, abstract rule 410 includes a predicate "PRED_1" and an action "REJECT." Assume "PRED_1" is a rule predicate that, when evaluated against a data record of query results 312, resolves to TRUE or FALSE, indicating whether the condition of the rule predicate is satisfied for a given set of input data. Assume also that the rule action "REJECT" results in rejecting the present data record from being evaluated by other abstract rules in the container. That is, the rule set container 340 includes abstract rule 410 which is not evaluated against any rejected data record. As indicated by a horizontal arrow, abstract rule 410 may be translated (e.g., by rule translator 160) to executable rule 415. Note that executable rule 415 includes executable translations of the rule predicate "PRED_1" and rule action "REJECT."

As shown, abstract rule 420 includes rule predicate "PRED_2" and rule action "ACTION-A," and may be translated into executable rule 425. Similarly, abstract rule 430 includes rule predicate "PRED_3" and rule action "ACTION_B," and may be translated into executable rule 435. Assume that abstract rules 410, 420 and 430 are included in a rule set container 340. Assume also that the predicate "PRED_1" is evaluated using a data record of query results 312, and is resolved to FALSE. In this situation, the rule action "REJECT" results in the current data record being rejected from evaluation with the remaining rules in the rule set container 340. Thus, abstract rule 410 may be described as affecting abstract rules 420 and 430, since it may preclude their execution for a given data record.

In one embodiment, the effect of an abstract rule may be incorporated into the executable forms of other rules in the same rule set container 340. As shown in FIG. 4B, the predicate and action of rule 410 may be combined with the abstract rule 420 (as illustrated by a dotted arrow), such that the executable rule 427 performs the same function as abstract rules 410 and 420. Likewise, the translation of abstract rule 430 to executable rule 437 may include the predicate and action of rule 410 and 430. Thus, processing the rule set container 340 can be performed with two rule executions (i.e., processing executable rules 427 and 437), rather than three rule executions, as required in the situation illustrated in FIG. 4A. Such reductions in the number of rule executions may result in reduced processing loads and licensing costs for the rule engine.

In another embodiment, abstract rules that have the effect of rejecting data records from being processed as inputs to rule set container 340 (e.g., abstract rule 410) (hereafter referred to as rejection rules), may be translated into rejection queries. In other words, rather than combining the predicate and action of a rejection rule into other rules (as described above with reference to FIG. 4B), the effect of the rejection rule may be achieved by performing a rejection query to define a rejection set of data records. As shown in FIG. 4C, abstract rule 410 is a rejection rule, and may be translated into a rejection query 418 by, e.g., rule translator 160. As configured, the rejection query 418 returns a rejection set "REJECTION_LIST," composed of all data records of query results 312 that satisfy rule predicate "PRED_1." Note that, in this example, rejection query 418 is depicted using the SQL query language. However, rejection query 418 may be composed with any query language or technique suitable to the application.

As shown, in this embodiment, abstract rule 420 may be translated into executable rule 428, which incorporates a rule predicate that excludes any data records included in the rejection set "REJECTION_LIST." This embodiment may be used in situations where the combination of abstract rules into executable rules, as discussed above, may result in complex executable rules. For example, referring to FIG. 4B, assume executable rule 427 is determined to be excessively complex, meaning that processing it would places a heavy demand on rule engine 150, and would result in unacceptable processing times and licensing charges. Accordingly, in such situations, it may be advantageous to translate a rejection rule into a rejection query, rather than combining the rejection rule into translated versions of affected abstract rules.

Referring again to FIG. 3, the executable rule 360 is processed by the rule engine 150, using each data record of the query results 312 as an input. This processing results in a rule output 380, which is returned to the application 120 for completing analysis routines, such as diagnosis recommendations, drug recommendations, and the like.

Of course, the above examples are provided for illustrative purposes only, and are not intended to limit the scope of the invention. It should also be noted that the components of the relational view 300 are illustratively shown as separate software components. However, embodiments are contemplated in which functionality of any component may be incorporated in another component.

Figure 5:
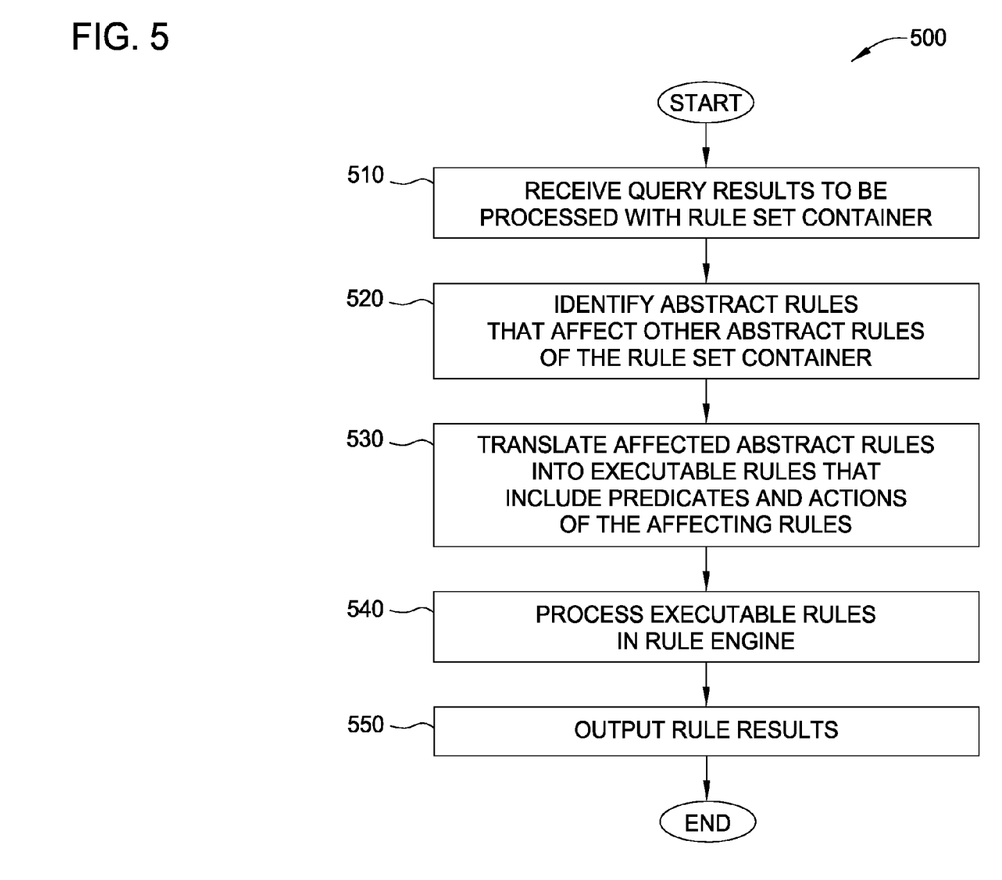
FIG. 5 is a flow diagram illustrating a method for processing abstract rules with query results, according to one embodiment of the invention.

FIG. 5 is a flow diagram illustrating a method 500 for processing abstract rules with query results, according to one embodiment of the invention. Persons skilled in the art will understand that, even though the method is described in conjunction with the systems of FIGS. 1-3, any system configured to perform the steps of method 500, in any order, is within the scope of the present invention.

The method 500 begins at step 510, by receiving query results to be processed as inputs to a rule set container. Referring to the example shown in FIG. 3, query results 312 may be received for use as inputs to rule set container 340. Query results 312 may be produced by translating abstract query 202 into a resolved query 302, which may be submitted to DBMS 116 for execution against database 214. Query results 312 may represent, for example, data records of medical patients. At step 520, any abstract rules that affect other abstract rules included in the same rule set container may be identified. Such rules having an effect may, for example, exclude data records from being used as inputs to the rule set container, or order the data records according to a priority of importance. For example, as illustrated in FIG. 4A, abstract rule 410 may affect abstract rules 420 and 430 by rejecting data records that satisfy the predicate "PRED_1."

At step 530, any affected abstract rules may be translated into executable rules that incorporate the predicates and actions of the affecting abstract rules. In other words, the effect of an abstract rule may be incorporated into the executable forms of other rules in the same rule set container. For example, as illustrated in FIG. 4B, the predicate and action of rule 410 may be combined with the abstract rule 420, such that the executable rule 427 performs the same function as abstract rules 410 and 420. The translation of abstract rules to executable rules may be performed, for example, by the rule translator 160.

At step 540, the executable rules may be processed using the input values of the query results. Generally, each executable rule is processed separately, using the input values included in a single data record of the query results. For example, the executable rule 360 may be executed by rule engine 150 using the input values of the query results 312, as shown in FIG. 3. At step 550, the rule results may be output. For example, rule output 380 may be returned to application 120, as shown in FIG. 3. The rule output may represent aggregated rule results from multiple data records of the query results. After step 550, the method 500 terminates.

Figure 6:
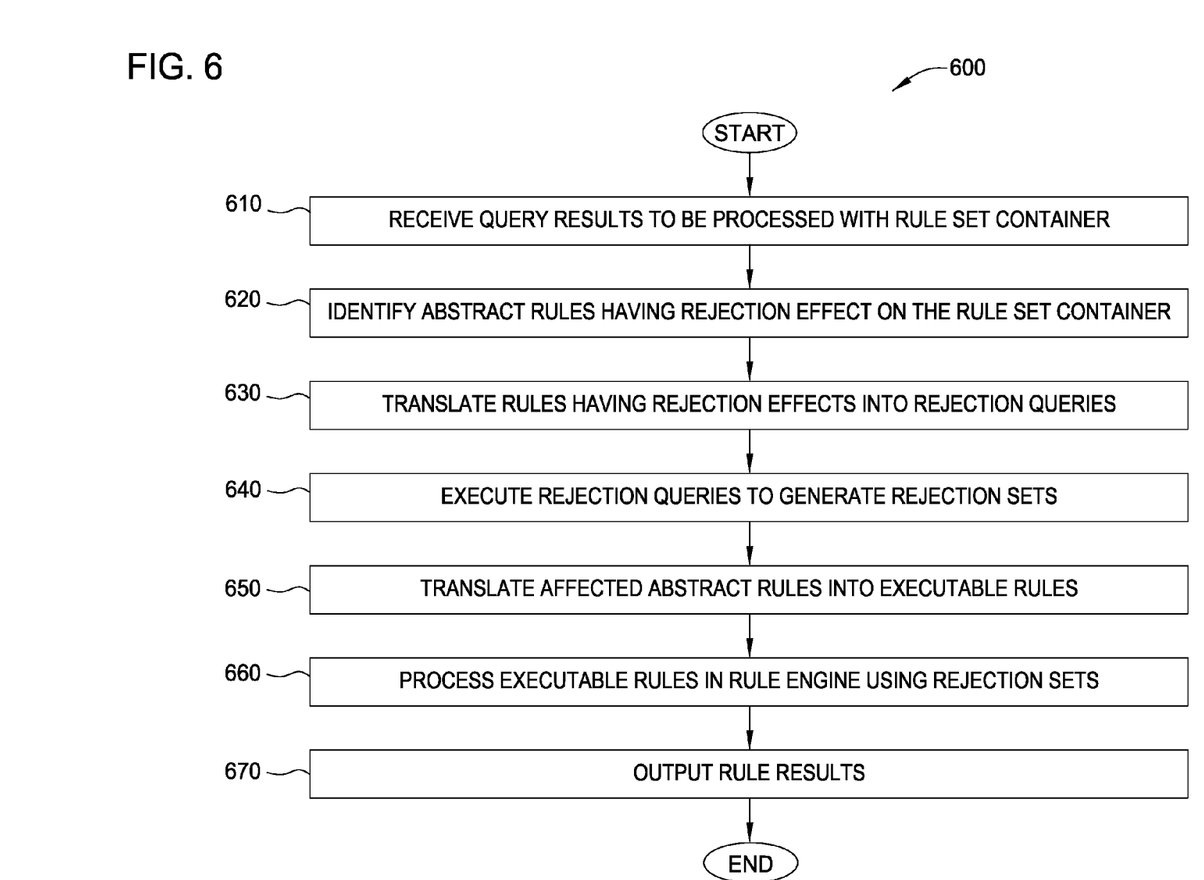
FIG. 6 is a flow diagram illustrating a method for processing complex abstract rules with query results, according to one embodiment of the invention.

FIG. 6 is a flow diagram illustrating a method 600 for processing complex abstract rules with query results, according to one embodiment of the invention. In certain situations, step 530 of method 500 may result in complex executable rules. Such complex executable rules may impose a heavy processing load on a rule engine, and may result in unacceptable processing times and licensing charges. Accordingly, in such situations, method 600 may be used instead of method 500. In particular, method 600 may be used in situations where rules affecting other rules have the effect of rejecting data records from being processed as inputs to the abstract rules. Persons skilled in the art will understand that, even though the method is described in conjunction with the systems of FIGS. 1-3, any system configured to perform the steps of method 600, in any order, is within the scope of the present invention.

As shown, the method 600 begins at step 610, by receiving query results to be processed as inputs to a rule set container. For example, query results 312 may be received for use as inputs to rule set container 340. At step 620, any abstract rules that have a rejection effect on other abstract rules included in the same rule set container may be identified. For example, as illustrated in FIGS. 4A-4B, abstract rule 410 may affect abstract rules 420 and 430 by rejecting data records that satisfy the predicate "PRED_1."

At step 630, the abstract rules having rejection effects may be translated into rejection queries. That is, a rejection rule may be translated into a rejection query for defining a set of data records rejected from being processed as data inputs. At step 640, the rejection queries may be executed to generate rejection sets. The rejection sets only include the data records of the query results that would be rejected by the rejection rules. At step 650, any affected abstract rules may be translated into executable rules. The translation of abstract rules to executable rules may be performed, for example, by the rule translator 160. At step 660, the executable rules may be processed using the data records of the rejection sets. That is, the executable rules may be configured to process the data records that would have been rejected by the rejection rules. Thus, the functions of the rejection rules are performed without requiring additional executions of the rule engine, resulting in reduced processing time and licensing costs. At step 670, the rule results may be output. For example, rule output 380 may be returned to application 120, as shown in FIG. 3.

Advantageously, embodiments of the invention provide techniques for optimizing the processing of abstract rules. Currently, each abstract rule must be processed in a rule engine. In one embodiment, a predicate and an action of a first abstract rule may be used in translating a second abstract rule into an executable rule. The executable rule may performs the functionality represented by the first and second abstract rules, while only requiring one rule execution in a rule engine. Accordingly, the processing load and licensing cost of using the rule engine may be reduced.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
    receiving a rule set container storing a plurality of abstract rules, wherein each abstract rule includes (i) a conditional statement and (ii) a consequential statement defining a result returned by an abstract rule for a data record supplied to the abstract rule satisfying the conditional statement;
    identifying a first abstract rule among the plurality of abstract rules, wherein the consequential statement of the first abstract rule specifies to reject data records that satisfy the conditional statement of the first abstract rule from being processed by other abstract rules among the plurality of abstract rules;
    identifying a second abstract rule among the plurality of abstract rules, wherein the consequential statement of the second abstract rule specifies an inference message to return for data records that satisfy the conditional statement of the second abstract rule;
    transforming the first abstract rule and the second abstract rule into a single executable rule, wherein the single executable rule includes the consequential statement of the second abstract rule and a new conditional statement, the new conditional statement comprising the conditional statement of the second abstract rule and an exclusionary conditional statement that excludes data records satisfying the conditional statement of the first abstract rule; and
    storing the single executable rule for execution against a database query result.

2. The computer-implemented method of claim 1, further comprising:
    receiving the database query result, comprising a plurality of data records;
    executing the single executable rule against the plurality of data records; and
    returning the inference message for data records that satisfy the new conditional statement included in the single executable rule.

3. The computer-implemented method of claim 1, wherein the conditional statement of the first abstract rule and the conditional statement of the second abstract rule are composed from a plurality of logical fields defined in a data abstraction model modeling an underlying physical database.

4. The computer-implemented method of claim 3, wherein the rule set container further includes an abstract query composed from the plurality of logical fields defined in the data abstraction model, and wherein the method further comprises:
    transforming the abstract query into an executable query; and
    executing the executable query to retrieve a plurality of data records processed by the first abstract rule and the second abstract rule.

5. The computer-implemented method of claim 1, wherein the inference message specifies a recommendation for medical treatment.

6. The computer-implemented method of claim 1, wherein transforming the first abstract rule and the second abstract rule into a single executable rule comprises:
    retrieving a specification of the first abstract rule and a specification of the second abstract rule in a first computer-readable language; and
    transforming the retrieved specifications into a data format configured for a rules engine.

7. The computer-implemented method of claim 1, wherein the exclusionary conditional statement is based on a rejection query, wherein the rejection query returns a rejection set comprising a plurality of data records to be excluded from processing.

8. A computer readable storage medium containing a program which, when executed, performs an operation comprising:
    receiving a rule set container storing a plurality of abstract rules, wherein each abstract rule includes (i) a conditional statement and (ii) a consequential statement defining a result returned by an abstract rule for a data record supplied to the abstract rule satisfying the conditional statement;
    identifying a first abstract rule among the plurality of abstract rules, wherein the consequential statement of the first abstract rule specifies to reject data records that satisfy the conditional statement of the first abstract rule from being processed by other abstract rules among the plurality of abstract rules;

identifying a second abstract rule among the plurality of abstract rules, wherein the consequential statement of the second abstract rule specifies an inference message to return for data records that satisfy the conditional statement of the second abstract rule;

transforming the first abstract rule and the second abstract rule into a single executable rule, wherein the single executable rule includes the consequential statement of the second abstract rule and a new conditional statement, the new conditional statement comprising the conditional statement of the second abstract rule and an exclusionary conditional statement that excludes data records satisfying the conditional statement of the first abstract rule; and storing the single executable rule for execution against a database query result.

9. The computer readable storage medium of claim 8, wherein the operation further comprises:

receiving the database query result, comprising a plurality of data records;

executing the single executable rule against the plurality of data records; and returning the inference message for data records that satisfy the new conditional statement included in the single executable rule.

10. The computer readable storage medium of claim 8, wherein the conditional statement of the first abstract rule and the conditional statement of the second abstract rule are composed from a plurality of logical fields defined in a data abstraction model modeling an underlying physical database.

11. The computer readable storage medium of claim 10, wherein the rule set container further includes an abstract query composed from the plurality of logical fields defined in the data abstraction model, and wherein the operation further comprises:

transforming the abstract query into an executable query; and executing the executable query to retrieve a plurality of data records processed by the first abstract rule and the second abstract rule.

12. The computer readable storage medium claim 8, wherein the inference message specifies a recommendation for medical treatment.

13. The computer readable storage medium of claim 8, wherein transforming the first abstract rule and the second abstract rule into a single executable rule comprises:

retrieving a specification of the first abstract rule and a specification of the second abstract rule in a first computer-readable language; and transforming the retrieved specifications into a data format configured for a rules engine.

14. The computer readable storage medium of claim 8, wherein the exclusionary conditional statement is based on a rejection query, wherein the rejection query returns a rejection set comprising a plurality of data records to be excluded from processing.

15. A system comprising:

a processor; and a memory containing a program which, when executed on the processor, is configured to process an abstract rule by performing the steps of:

receiving a rule set container storing a plurality of abstract rules, wherein each abstract rule includes (i) a conditional statement and (ii) a consequential statement defining a result returned by an abstract rule for a data record supplied to the abstract rule satisfying the conditional statement;

identifying a first abstract rule among the plurality of abstract rules, wherein the consequential statement of the first abstract rule specifies to reject data records that satisfy the conditional statement of the first abstract rule from being processed by other abstract rules among the plurality of abstract rules;

identifying a second abstract rule among the plurality of abstract rules, wherein the consequential statement of the second abstract rule specifies an inference message to return for data records that satisfy the conditional statement of the second abstract rule;

transforming the first abstract rule and the second abstract rule into a single executable rule, wherein the single executable rule includes the consequential statement of the second abstract rule and a new conditional statement, the new conditional statement comprising the conditional statement of the second abstract rule and an exclusionary conditional statement that excludes data records satisfying the conditional statement of the first abstract rule; and storing the single executable rule for execution against a database query result.

16. The system of claim 15, wherein the steps further comprise:

receiving the database query result, comprising a plurality of data records;

executing the single executable rule against the plurality of data records; and returning the inference message for data records that satisfy the new conditional statement included in the single executable rule.

17. The system of claim 15, wherein the conditional statement of the first abstract rule and the conditional statement of the second abstract rule are composed from a plurality of logical fields defined in a data abstraction model modeling an underlying physical database.

18. The system of claim 17, wherein the rule set container further includes an abstract query composed from the plurality of logical fields defined in the data abstraction model, and wherein the steps further comprise:

transforming the abstract query into an executable query; and executing the executable query to retrieve a plurality of data records processed by the first abstract rule and the second abstract rule.

19. The system of claim 15, wherein the inference message specifies a recommendation for medical treatment.

20. The system of claim 15, wherein transforming the first abstract rule and the second abstract rule into a single executable rule comprises:

retrieving a specification of the first abstract rule and a specification of the second abstract rule in a first computer-readable language; and transforming the retrieved specifications into a data format configured for a rules engine.

21. The system of claim 15, wherein the exclusionary conditional statement is based on a rejection query, wherein the rejection query returns a rejection set comprising a plurality of data records to be excluded from processing.

* * * * *